(12) United States Patent
Birecki et al.

(10) Patent No.: US 10,386,690 B2
(45) Date of Patent: Aug. 20, 2019

(54) MEDIA WITH RECESSED E-PAPER DISPLAY

(71) Applicant: Hewlett-Packard Development Company, L.P., Spring, TX (US)

(72) Inventors: Henryk Birecki, Palo Alto, CA (US); Napoleon J Leoni, Palo Alto, CA (US); Omer Gila, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 89 days.

(21) Appl. No.: 15/114,471

(22) PCT Filed: Jan. 31, 2014

(86) PCT No.: PCT/US2014/014309
§ 371 (c)(1),
(2) Date: Jul. 27, 2016

(87) PCT Pub. No.: WO2015/116213
PCT Pub. Date: Aug. 6, 2015

(65) Prior Publication Data
US 2016/0349591 A1 Dec. 1, 2016

(51) Int. Cl.
*G02B 26/00* (2006.01)
*G02F 1/167* (2019.01)
*G09F 9/30* (2006.01)
*G09F 7/18* (2006.01)
*G09F 9/37* (2006.01)
*G02F 1/1676* (2019.01)
*G09F 7/00* (2006.01)
*G02F 1/1333* (2006.01)

(52) U.S. Cl.
CPC ............... *G02F 1/167* (2013.01); *G09F 7/18* (2013.01); *G09F 9/30* (2013.01); *G09F 9/372* (2013.01); *G02F 1/133308* (2013.01); *G02F 1/1676* (2019.01); *G09F 2007/007* (2013.01); *G09F 2007/1843* (2013.01)

(58) Field of Classification Search
CPC ...................................................... G02F 1/167
USPC ........................................................ 359/296
See application file for complete search history.

(56) References Cited

U.S. PATENT DOCUMENTS

| 5,866,284 A | 2/1999 | Vincent |
| 6,333,754 B1 | 12/2001 | Oba et al. |
| 6,473,072 B1* | 10/2002 | Comiskey ............... B41J 3/4076 345/107 |
| 6,515,790 B2* | 2/2003 | Miyamoto ............... G02F 1/167 359/296 |
| 6,982,734 B2 | 1/2006 | Pan et al. |
| 7,140,550 B2 | 11/2006 | Ramachandran |

(Continued)

FOREIGN PATENT DOCUMENTS

| CN | 103154857 | 6/2013 |
| JP | 2008012207 | 1/2008 |

(Continued)

OTHER PUBLICATIONS

The Generation Beyond Print-on-Paper; Kleper, M. et al.; Sep. 2002; http://print.rit.edu/pubs/02_01_kleper.pdf.

*Primary Examiner* — James C. Jones
(74) *Attorney, Agent, or Firm* — Dicke Billig & Czaja PLLC

(57) ABSTRACT

A media includes a frame and an e-paper display recessed relative to a portion of the frame.

16 Claims, 7 Drawing Sheets

(56) References Cited

U.S. PATENT DOCUMENTS

| | | |
|---|---|---|
| 7,580,845 B2 | 8/2009 | Burman |
| 7,825,403 B2 | 11/2010 | Aoki |
| 8,144,388 B2 | 3/2012 | Ogawa |
| 8,514,256 B2 | 8/2013 | Ogawa et al. |
| 8,545,302 B2 | 10/2013 | Wu |
| 2003/0067427 A1 | 4/2003 | Comiskey et al. |
| 2005/0134550 A1 | 6/2005 | Schmitz |
| 2006/0017659 A1 | 1/2006 | Ogawa et al. |
| 2006/0125778 A1 | 6/2006 | Apte |
| 2007/0045399 A1 | 3/2007 | Martin |
| 2011/0298760 A1 | 12/2011 | Gila |
| 2012/0206341 A1 | 8/2012 | Gila et al. |
| 2012/0320001 A1 | 12/2012 | Gila et al. |
| 2012/0320541 A1 | 12/2012 | Chen |
| 2013/0003162 A1 | 1/2013 | Leoni |
| 2013/0114124 A1 | 5/2013 | Suwald |
| 2013/0222349 A1 | 8/2013 | Baek et al. |
| 2013/0235446 A1 | 9/2013 | Leoni et al. |
| 2014/0210805 A1 | 7/2014 | Birecki et al. |
| 2014/0239068 A1 | 8/2014 | Park |
| 2014/0253426 A1 | 9/2014 | Leoni et al. |

FOREIGN PATENT DOCUMENTS

| | | |
|---|---|---|
| JP | 2011170019 | 9/2011 |
| KR | 20120092208 | 8/2012 |
| KR | 20130062992 | 6/2013 |
| WO | WO-2013058757 | 4/2013 |

\* cited by examiner

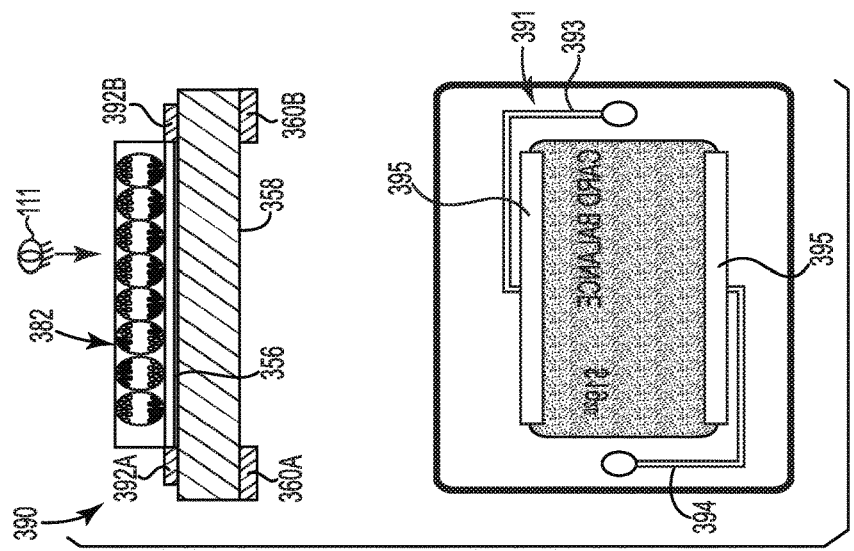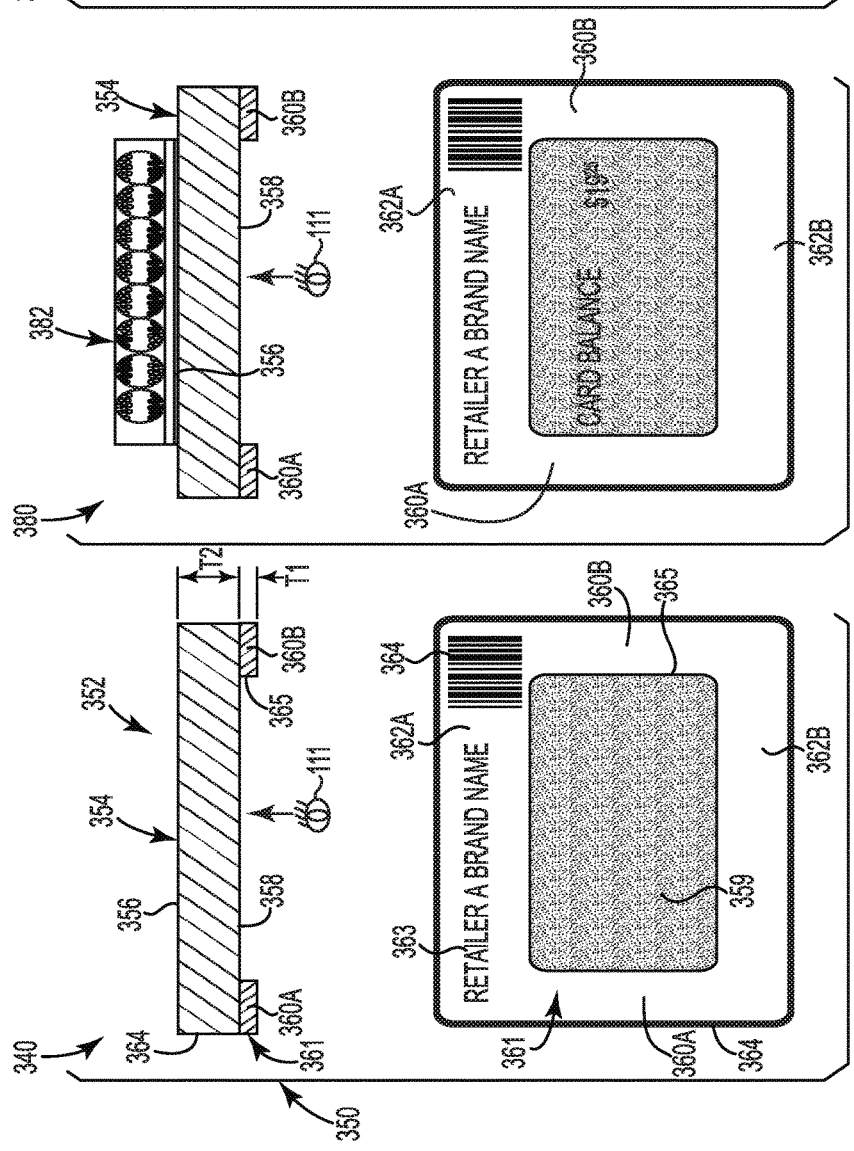

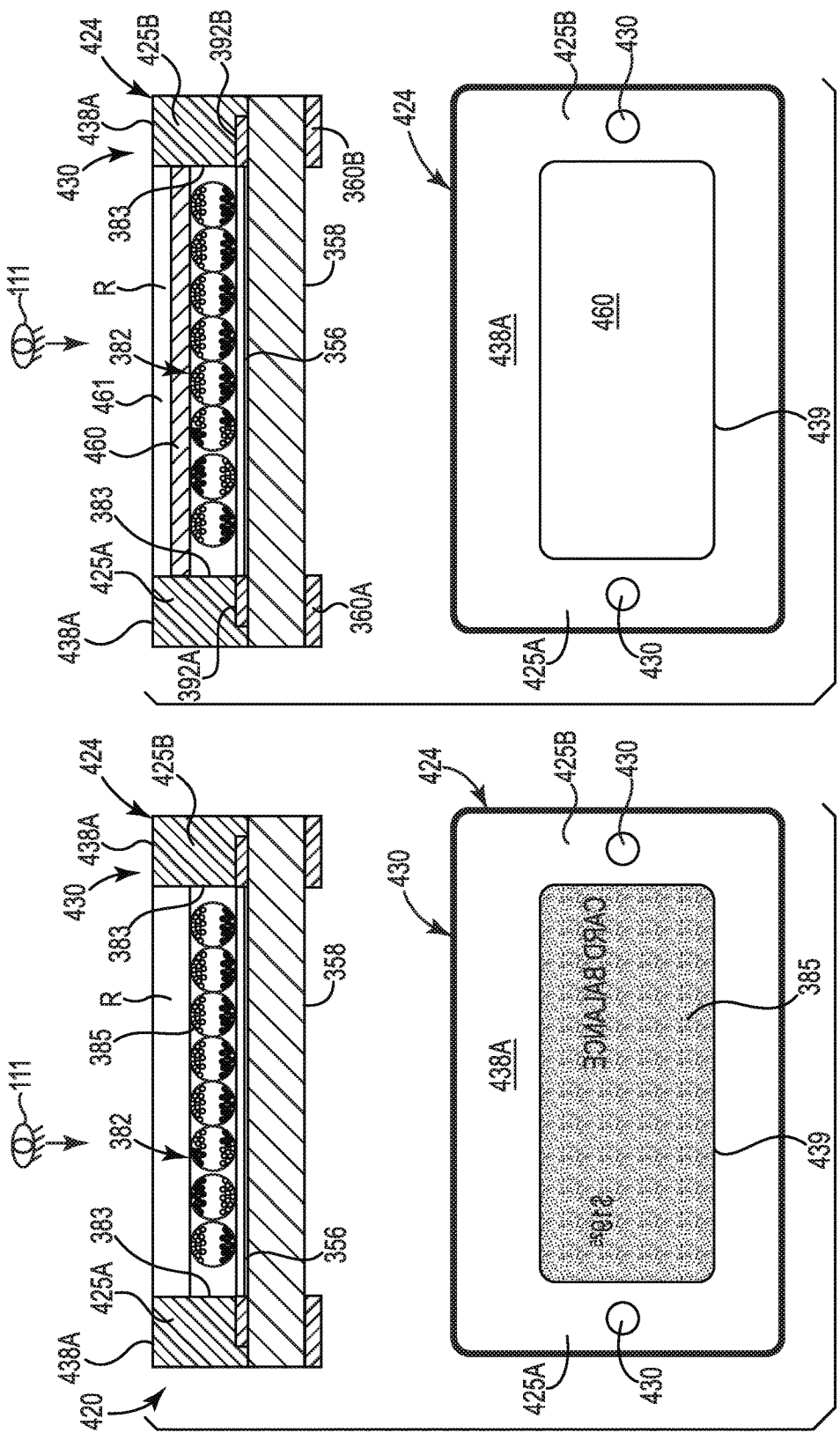

MEDIA WITH RECESSED E-PAPER DISPLAY

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

BRIEF DESCRIPTION OF THE DRAWINGS

FIGS. 9A-9E are a series of diagrams schematically illustrating various stages of construction of a media including a recessed passive e-paper display, according to an example of the present disclosure, with each diagram including a side view and an accompanying top or bottom plan view.

DETAILED DESCRIPTION

Figure 1:
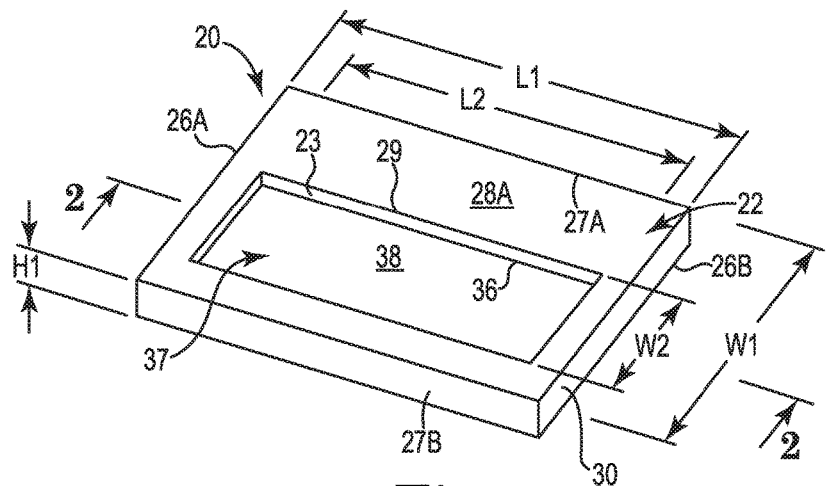
FIG. 1 is a perspective view schematically illustrating a media including a recessed, passive e-paper display, according to an example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense.

In at least some examples of the present disclosure, a media includes a passive e-paper display at least partially embedded within a frame and with an imaging surface of the e-paper display exposed within, and recessed relative to, a first aperture in a portion of the frame. The exposed imaging surface is accessible for imaging by an external writing module, which performs non-contact application of charges (e.g. through-the-air emission of ions) to image the passive e-paper display. Accordingly, in one aspect, the frame of the media acts as a built-in spacer to achieve a consistent, desired gap between the imaging head of the external writing module and the imaging surface of the passive e-paper display.

In some examples, the portion of the media frame that defines the first aperture includes a top surface that is generally planar and flat to receive sliding engagement of a contact portion of a writing module (which includes the imaging head). In one aspect, this generally planar, flat surface (of the media frame) provides a predetermined spacing vertically above the imaging surface of the e-paper (exposed within the first aperture of the frame) such that there are fewer constraints on a possible size, shape, and engaging surface of the contact portions of the writing module. In other words, because the media frame provides the primary, desired spacing constraint for imaging the e-paper display, a wider range of different types of contact portions of a writing module become feasible. Accordingly, in some examples, the engaging surface of the contact portions of the writing module has features other than a flat, generally planar surface.

In some examples, via the recessed position of the e-paper display within the frame of the media, a generally constant, uniform gap is maintained between an imaging head (of the writing module) and the exposed imageable surface of the e-paper display, thereby ensuring high image quality and consistency. In one aspect, this gap is sufficiently large to negate an expected variability (e.g. tolerances) in the topology of the flat, generally planar top surface of the media frame (that contains the recessed, embedded e-paper display) such that those typical variances do not affect the imaging of the e-paper. In some examples, the imaging surface of the e-paper display is recessed from the top surface of the media frame by about 250 to about 1000 microns.

Moreover, in another aspect, this recessed arrangement provides general mechanical protection to the imaging surface of the e-paper display when the media is handled by the users in everyday tasks, such as placing media within a wallet or purse, handling by sales personnel, "swiping" actions, etc. The recess also reduces chances for abrasion against the imaging surface of the e-paper while also reducing chances for inadvertent (or even conscious) erasure or modification of the imaged content of the media.

These examples, and additional examples, are described and illustrated in association with at least FIGS. 1-10.

Figure 2:
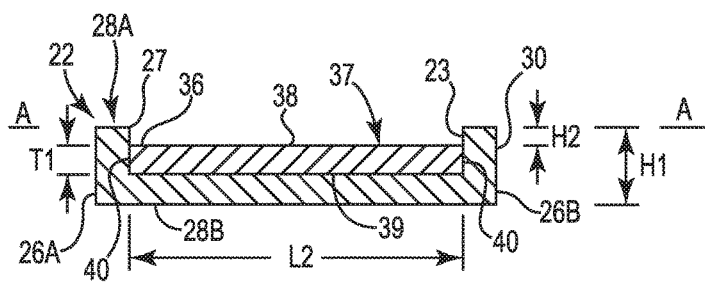
FIG. 2 is a side sectional view as taken along lines 2-2 of FIG. 1, according to an example of the present disclosure.

FIG. 1 is a perspective view of a media 20 including a recessed e-paper display 37, according to an example of the present disclosure. FIG. 2 is a side sectional view as taken along lines 2-2 of FIG. 1. As shown in at least FIG. 1, media 20 includes a frame 22 having opposite ends 26A, 26B, opposite side edges 27A, 27B, and opposite surfaces 28A, 28B (FIG. 2). In general terms, media 20 includes any visual medium of content consumption, such as financial transaction media (e.g. gift cards, prepaid cards, insurance cards, credit cards, etc.) or information transaction media (e.g. shelf tags, boarding passes, shipping labels, package tracking in general). In some examples, additional forms of media 20 include school material, such as tests, in-class homework, etc. In some examples, media 20 includes large format flexible rewritable displays, such as engineering drawings, architectural drawings, production specifications, etc.

In at least some examples of the present disclosure, in addition to the changeable content available via e-paper display 37, media 20 includes fixed content appearing one or both surfaces 28A, 28B of frame 22 with the fixed content including text, graphics, and/or images.

In at least some examples of the present disclosure, e-paper display 37 is a passive e-paper display. In one aspect, the e-paper display 37 is passive in the sense that it is re-writable and holds an image without being connected to an active power source during the writing process and/or after the writing is completed. Instead, as further described later, the passive e-paper display is imaged in a non-contact manner in which the e-paper display receives charges (emitted by a ion head) that travel through the air and then cause a response in charged particles within the electronic paper display. After the imaging process is completed, the passive e-paper display 37 retains the image generally indefinitely and without a power supply.

In at least some examples, the passive e-paper display 37 operates consistent with electrophoretic principles. With this in mind, in at least some examples, passive e-paper display 37 includes an imageable layer responsive to electrical fields and charges applied in a non-contact manner in which the imageable layer includes active components of material that switch color when a field or charges are applied. In one example, the passive e-paper display 37 includes a charge-responsive layer containing a color switchable components and a conductive layer which serves as a counter-electrode on one side of the e-paper display 37. In some examples, the color switchable components include pigment/dye elements within microcapsules, with the microcapsules encapsulated within resin/polymer. In some examples, an additional functional coating is applied to an imaging side of the e-paper 37.

One implementation of an e-paper display structure according to at least some examples of the present disclosure is later described and illustrated in association with at least FIGS. 7-8B. In one aspect, the e-paper display structures shown in FIGS. 7-8B includes microcapsules containing a dispersion of pigmented particles in a dielectric oils.

In some examples, e-paper display 37 is constructed via placing celled structures between two containing walls. In some examples, e-paper display 37 includes air borne particles insides capsules, such as a "quick response liquid powder display" formerly available from Bridgestone Corporation of Tokyo, Japan.

In some examples, frame 22 is made from a polycarbonate or polyvinylchloride (PVC) material. However, in more general terms, frame 22 is made from a resilient or semi-rigid material that is generally non-conductive.

As shown in FIG. 1, in some examples, a frame 22 of media 20 has a width (W1) that is greater than an exposed width (W2) of e-paper display 37, a length (L1) that is greater than an exposed width (L2) of e-paper display 37, and a height (H1).

As shown in FIGS. 1-2, in some examples the e-paper display 37 is embedded within frame 22 such that the imaging surface 37 is exposed within, and recessed relative to, aperture 29 formed in top surface 28A of frame 22. In one aspect, this recessed position of e-paper display 37 (relative to surface 28A of frame 22) provides protection to imaging surface 38 when media 20 is handled by the users in everyday tasks, such as placing media 20 within a wallet or purse, handling by sales personnel, or "swiping" actions, etc. In another aspect, an opposite, non-imaging side 39 of e-paper display 37 faces the top surface 71 of first structural support 70A.

As further shown in FIG. 2, in some examples, e-paper display 37 has a thickness (T1) that is less than an overall height (H1) of frame 22 with e-paper display 37 positioned within frame 22 to be recessed by a depth (H1) relative to a top surface 28A of frame 22. In other words, e-paper display 37 is embedded within frame 22 in such a manner that the top surface 28A of frame 22 extends in plane A that is vertically spaced above (by a height H2) the generally planar imaging surface 38 of e-paper display 37.

In some examples, as shown in FIGS. 1-2, an inner edge 23 of aperture 29 in top surface 28A of frame 22 extends about, and generally matches a size and a shape of an entire periphery (e.g. outer border 36) of the exposed imaging surface 38 of e-paper display 37.

Figure 3:
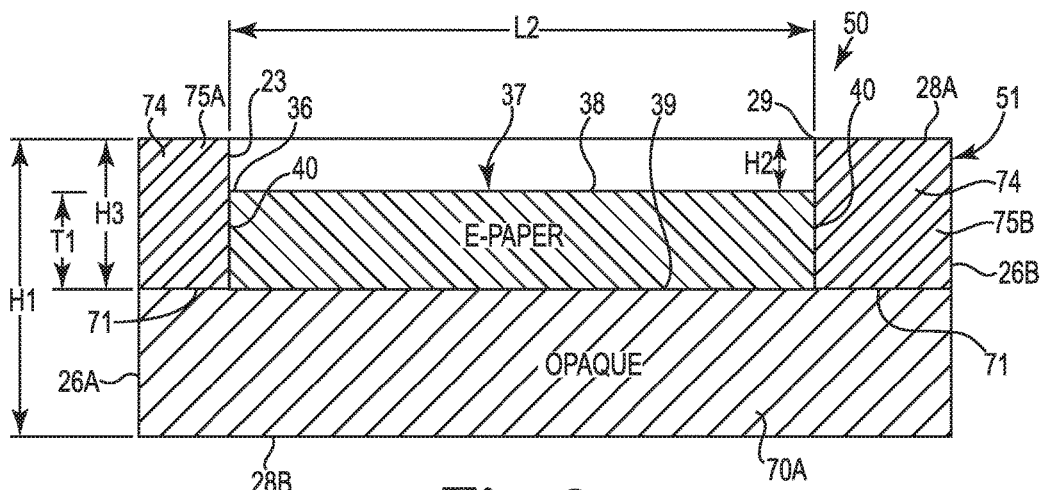
FIG. 3 is a side sectional view schematically representing a media including a recessed, passive e-paper display, according to an example of the present disclosure.

FIG. 3 is side sectional view schematically illustrating a media 50, according to one example of the present disclosure. In one example, media 50 includes at least some of substantially the same features and attributes as media 20. For instance, frame 51 of media 50 has generally the same spatial relationships relative to e-paper display 37 as frame 22 of media 20 has to e-paper display 37. However, in at least one aspect, frame 51 of media 50 is structured and/or assembled relative to e-paper display 37 differently in some respects than media frame 22 is structured relative to e-paper display 37.

As shown in FIG. 3, media 50 includes a frame 51 that includes a first structural support 70A and a second structural support 74 secured onto or relative to the first structural support 70A. In one aspect, portions 75A, 75B of second structural support 74 are located adjacent the outer edges 40 of e-paper display 37. With both e-paper display 37 and the second structural support 74 secured on a generally planar top surface 71 of first structural support 70A, the second structural support 74 has a height (H3) that is greater than a thickness (T1) of e-paper display 37.

In some examples, the first structural support 70A is opaque such that surface 38 of e-paper display 37 comprises both an imaging side and a viewing side of e-paper display 37.

Further examples of e-paper display 37, the structural relationship between e-paper display 37 and media frame 51, and construction of such media frames are described later in association with at least FIGS. 7-9E.

Figure 4A:
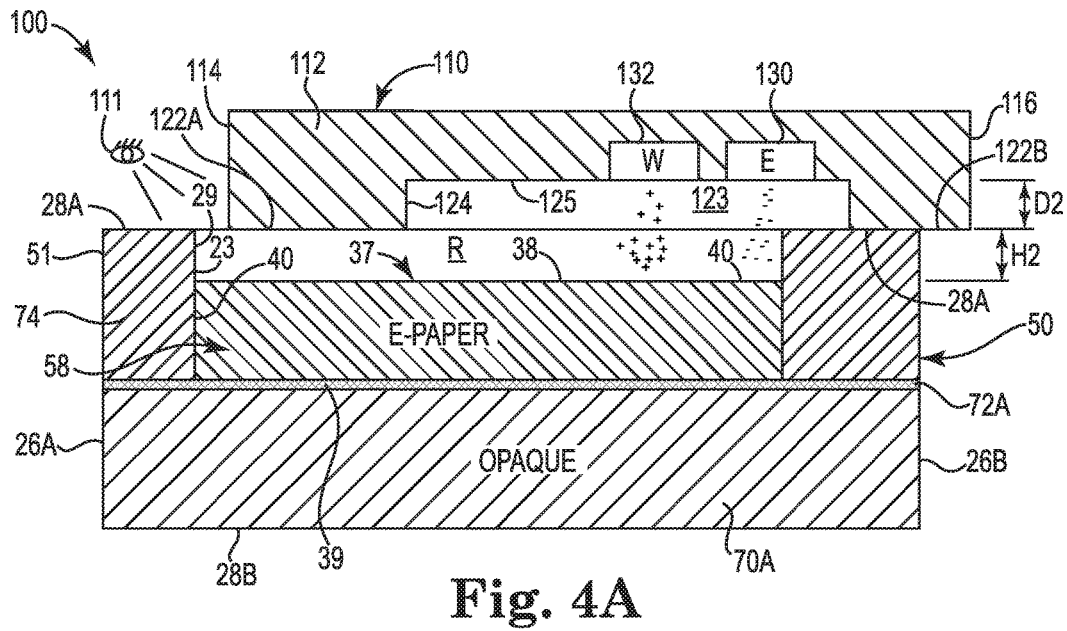
FIG. 4A is a side sectional view schematically representing of a writing module slidably engaging a media having a recessed, passive e-paper display, according to an example of the present disclosure.
Figure 4B:
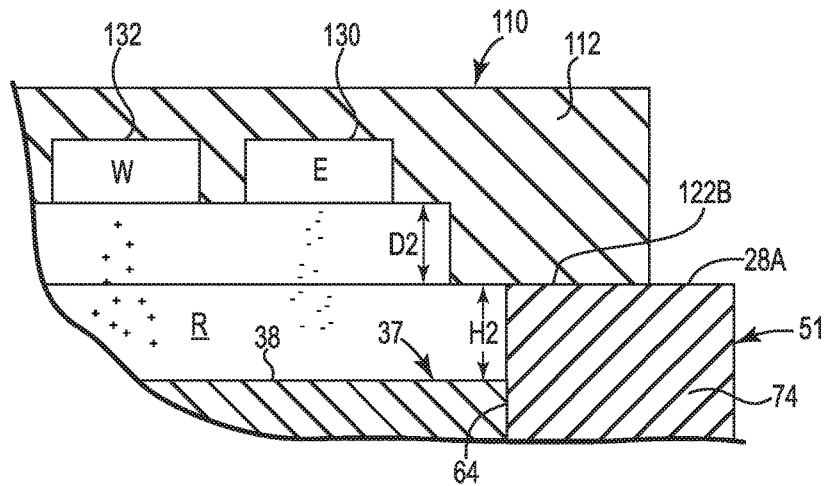
FIG. 4B is an enlarged partial view of a writing module engaging a media having a recessed, passive e-paper display, according to an example of the present disclosure.

FIG. 4A is a diagram 100 including a side sectional view schematically illustrating a writing module 110 and a media 50, according to one example of the present disclosure. FIG. 4B is an enlarged partial view of FIG. 4A to further highlight portions of media 50, including e-paper display 37 and writing module 110.

In one example, media 50 includes at least some of substantially the same features and attributes as media 50 (FIG. 3), except that FIG. 4A illustrates an example of a structure 58 that includes e-paper display 37 and a counter electrode 72A. As shown in FIG. 4A, counter electrode 72A is sandwiched between first structural support 70A and second structural support 74, and between first structural support 70A and e-paper display 37. In one aspect, counter electrode 72A facilitates imaging e-paper display 37 by facilitating reception of "through-the-air" charges emitted from an external writing module, as further described later in association with at least FIGS. 4A and 7-8B.

With this in mind, in some examples counter electrode 72 provides media 50 with a ground return path, which is a conductive path that allows counter charges to flow to a counter electrode (e.g. counter electrode 72A) from the imaging device (e.g. writing (W) head 132). This arrangement helps to maintain the e-paper display 37 in a generally charge neutral state in spite of the writing (W) head spraying charges on the imaging surface 38, thereby enabling an adequate amount of charges to be applied to surface 38 and thereby form an image. In one aspect, a potential at the counter electrode 72A does not necessarily correspond to ground, but is any reference potential appropriate for the imaging to be effective, i.e. to provide an electric field suitable to extract charges from the writing (W) head 132.

As further shown in FIG. 4A, in some examples the writing module 110 includes a body 112 extending between opposite ends 114, 116 and the body 112 defining a recess 123 and contact portions 122A, 122B disposed on opposite ends of recess 123. Writing module 110 also includes an erase (E) head 130 and a writing (W) head 132 mounted to be exposed at upper surface 125 of recess 123. In some examples, the erase and writing heads are ion-based devices. The writing (W) head 132 is longitudinally spaced apart from the erasing (E) head 130 so that upon sliding movement of writing module 110 relative to media 50, the erasing (E) head erases any images from e-paper display 37 prior to writing images via writing (W) head 132 onto e-paper display 37.

In general terms, writing module 110 is configured so that contact portions 122A, 122B are in slidable engagement against top surface(s) 28A of media 50 to protect the respective recessed erasing (E) and writing (W) heads 130,132 from abrasion and to reliably and consistently ensure non-contact, through-the-air charging of the imaging side 38 of e-paper structure 58.

Figure 4C:
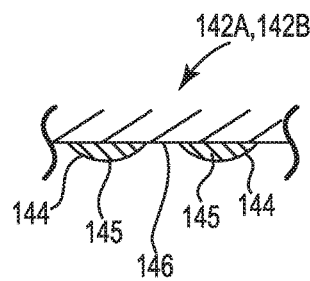
FIG. 4C is a side sectional view of a contact portion of a writing module, according to an example of the present disclosure.

In some examples, control portions 122A, 122B of writing module 110 comprise a generally planar flat surface. However, in other examples, the generally planar/flat surfaces defining the control portions 122A, 122B is replaced with surfaces 142A, 142B, such as but not limited to, a plurality of protrusions 144 raised from surface 146, as shown in FIG. 4C. The protrusions 144 form either a single dimensional or two-dimensional array. In one example, each protrusion includes an arcuate portion. In general terms, the protrusions 144 enable slidable movement of the contact portions 142A, 142B relative to the top surface 28A of the media frame 51, but will much less friction than when an entire surface of a contact portion (e.g. 122A, 122B) is generally planar. In one aspect, the respective apexes 145 of the multiple protrusions define a generally planar contact profile providing substantially less overall friction when slidably engaging a surface of the media frame.

Moreover, top surface 28A of media frame 51 defines an aperture 29 such that imaging surface 38 of e-paper display 37 is recessed relative to top surface 28A of frame 51 and relative to the plane P through which the contact portions 122A, 122B slidably move when engaging top surface 28A of media 50 such that contact portions 122A, 122A cannot abrade the e-paper display 37 during such sliding engagement. This recess (R) helps to maintain a generally constant and uniform gap between imaging surface 38 of e-paper display 58 and the respective erasing (E) and writing (W) heads 130, 132 to ensure consistency and high quality in imaging the e-paper structure 58.

In addition, even when writing module 110 is not in slidable engagement relative to media 50, the recessed e-paper display 37 (relative to top surface 28A of media frame 51) also helps to reduce abrasion cause by normal wear and tear of a user handling the media 50 in everyday use. With recess R resulting in less frequent and less direct contact of external objects against imaging surface 38 of e-paper display 37, the imaging side of e-paper display 37 is also better protected from influences that would otherwise tend to interfere with the ability of e-paper display 37 to retain a written image. Furthermore, in addition to this general surface protection, media frame 51 provides extra mechanical robustness and protection beyond the general strength of e-paper display 37.

In some examples, the depth of the recess R (as represented by H2) is about 250 to 1000 microns. In one example, an allowable variation in the spacing between the writing (W) head 132 and the imaging surface 38 of the e-paper display 37 is about 10% of H2. However, in at least some examples of the present disclosure, such variations are significantly minimized via the generally rigid structure of media frame 51 and the defined recess R providing a minimum gap of H2), in combination with the generally planar surface 28A of media frame 51.

Figure 5:
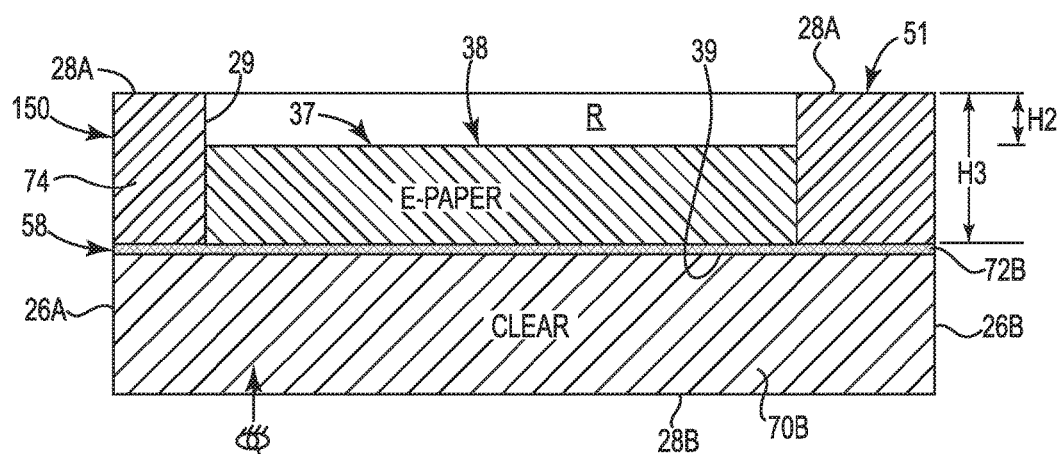
FIGS. 5 and 6 are each a side sectional view schematically representing a media including a recessed, passive e-paper display, according to an example of the present disclosure.

FIG. 5 is side sectional view schematically illustrating a media 150, according to one example of the present disclosure. In one example, media 150 includes at least some of substantially the same features and attributes as media 50, except including a first structural support 70B that is clear, transparent, or translucent. When e-paper display 37 is appropriately structured, such as when a counter-electrode 72B is transparent or at least translucent, this arrangement enables surface 39 of e-paper display 37 to become a viewing side (represented via eye icon 111) of e-paper display 37 while surface 38 remains the imaging side.

Figure 6:
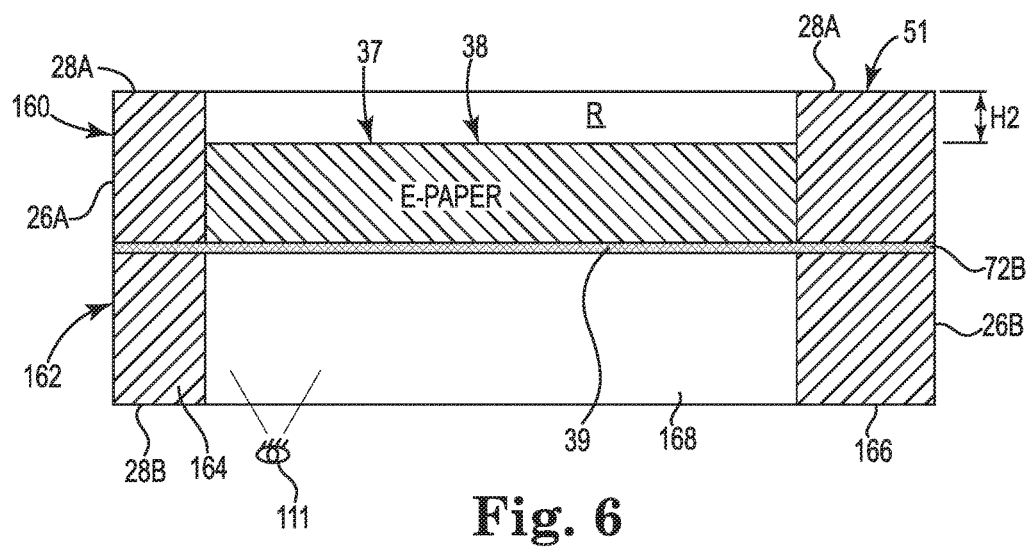

FIG. 6 is side sectional view schematically illustrating a media 160, according to one example of the present disclosure. In one example, media 160 includes at least some of substantially the same features and attributes as media 50, except including a first structural support 162 (instead of first structural support 70A or 70B) defining an opening or window 168 between portions 164, 166 of first structural support 162. When e-paper display 37 is appropriately structured, such as when a counter-electrode 72B is transparent or at least translucent, this arrangement enables surface 39 of e-paper display 37 to become a viewing side (as represented via eye icon 111) of e-paper display 37, while surface 38 remains the imaging side.

Figure 7:
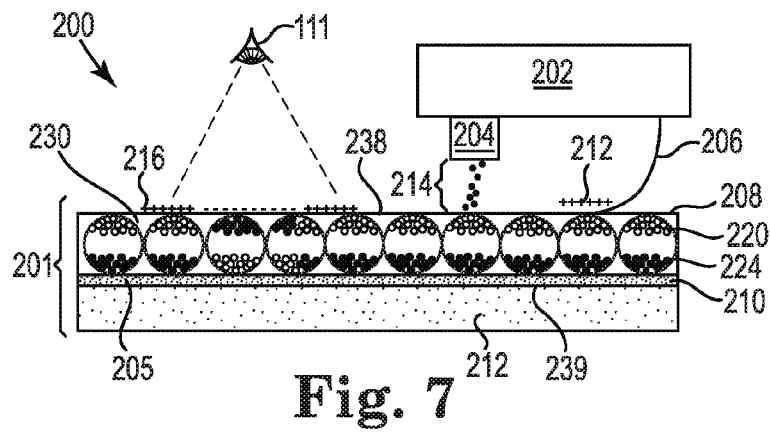
FIG. 7 is a side sectional view schematically illustrating a passive e-paper display and a writing module, according to an example of the present disclosure.

FIG. 7 is a side view providing a more detailed schematic representation of an e-paper display structure 201 and an associated e-paper writing system 200, according to one example of the present disclosure. In some examples, this e-paper structure 201 represents one general type of a passive e-paper display 37 used in a media such as 20, 50, 150, 160 as previously described in association with at least FIGS. 1-6. Meanwhile, writing system 200 represents a simplified version of writing module 110 (FIGS. 4A-4B) and is provided to generally illustrate a response of the e-paper structure 201 to an erasing head 206 and/or writing head 204.

As shown in FIG. 7, the writing system 200 includes a writing module 202, writing unit 204, and an erasing unit 206. The writing unit 204 and erasing unit 206 are connected to the same side of the writing module 202 that faces the outer surface of the charge receiving surface 208 of the media, with the writing unit 204 suspended above the surface 208. In the example of FIG. 7, the writing unit 204 is an ion head. The erasing unit 206 is an electrode that comes into close contact with, or that is dragged along, the surface 208 in front of the ion head 204. Erasing and writing is performed upon relative movement between the writing module 202 and the media.

In some examples, e-paper structure 201 includes an e-paper display 237 (like e-paper display 37) having an imaging side 238 and an opposite non-imaging side 239 and counter electrode 210, which are both secured on or relative to base 212.

In the example shown in FIG. 7, the black particles 224 and the white particles 220 of the microcapsules 205 are positively charged and negatively charged, respectively. The erasing unit 206 erases any information stored in the microcapsules prior to writing information with the ion head 204. In the example shown in FIG. 7, as the e-paper 201 passes under the writing module 202, the positively charged erasing unit 206 removes negatively charged ions that are attached to the surface 208. The positively charge erasing unit 206 also creates electrostatic forces that drive positively charged black particles 224 away from the charge receiving layer 208 and attract negatively charged white particles 220 toward the charge receiving layer 208. By passing the erasing unit 206 over the charge receiving layer 208, the information written to the e-paper structure 201 is erased by positioning the negatively charged white particles 220 near the top of the microcapsules 205 and pushing the positively charged black particles 224 to the bottom of the microcapsules 205.

FIG. 7 also shows an illustrative writing operation performed by the ion head 204, according to one example of the present disclosure. The ion head 204 is designed and operated to selectively eject electrons 214, shown as black bars, toward the charge receiving surface 208, when a region of the e-paper structure 201 located beneath the ion head 204 is to be changed from white to black. As the electrons 214 reach the surface 208, the negatively charged white particles 220 are repelled and driven away from the charge receiving surface 208, while the positively charged black particles 224 are attracted to the negatively charged electrons/ions 214 and driven toward the charge receiving surface 208. For example, as the ion head 204 passes over microcapsule 205 while ejecting electrons, the negatively charged white particles 220 are repelled away from the insulating layer and the positively charged black particles 224 are driven toward the charge receiving surface 208.

The e-paper writing system 200 is not limited to implementations in which the ion head 204 discharges electrons and the erasing unit 206 erases information with positive charges. In some examples, the microcapsules 205 in matrix material 230 of the charge-responsive layer are composed of negatively charged black particles and positively charged white particles. In some examples, the ion head 204 is designed to produce positively charged ions, which are absorbed by the surface 208 while the erasing unit 206 uses negative charges to erase information stored in the microcapsule layer of the e-paper 201.

Figure 8A:
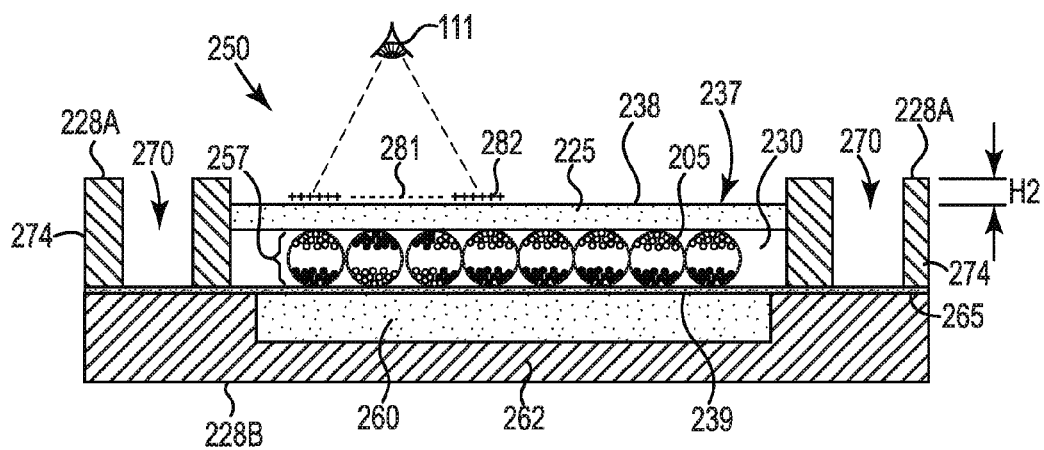
FIGS. 8A, 8B are side sectional views each schematically illustrating a media including a recessed passive e-paper display, according to an example of the present disclosure.
Figure 8B:
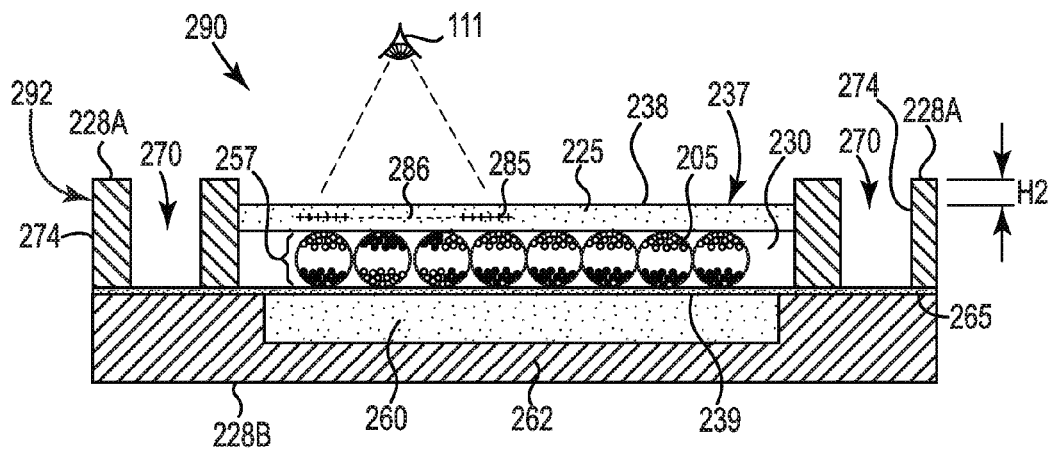

In some examples, in order to increase the robustness of e-paper display 237, a protective coating 225 is applied to form a top surface 238 of the e-paper display 237 shown in FIG. 8A. This coating is designed to protect the e-paper and microcapsules from mechanical damage, pressure and impact, and from collecting tribo charges. It also designed to reduce increases in dot size due to field screening during charging (the "blooming effect"). In one implementation, the charge receiving layer 225 has semiconducting characteristics which allow for a controlled decay of the latent charge image.

In one example, as represented via eye icon 211 in FIG. 7, the viewing side of e-paper display 237 is the same side as the imaging surface 238.

FIG. 8A is a cross section of an illustrative e-paper structure 250 which allows for controlled dissipation of charges, according to one example of the present disclosure. In some examples, this e-paper structure 250 represents one general type of a passive e-paper display 237 used in media 50 and related examples, as previously described in association with at least FIGS. 1-6. In particular, as shown in FIG. 8A, at least a second structural support 274 is arranged with its generally planar top surface 228A extending at a height (H2) above the imaging surface 238 of the e-paper display 37 to cause the e-paper imaging surface 238 to be recessed relative to top surface 228A of media frame and relative to any contact portions of a writing system or writing module 110 (FIG. 4A).

FIG. 8A includes a base 262 that structurally supports other components, a protective layer 260, a ground plane 265, microcapsules 205 in a charge-responsive layer 257, and a charge receiving layer 225. In one aspect, at least ground plane 265 and microcapsules within layer 257 together define an e-paper display 237, which includes a top "imaging" surface 238 and an opposite bottom "non-imaging" surface 239. In one aspect, the base 262 is relatively thick, on the order of 500 μm or greater. Ground access windows 270 are positioned laterally of the e-paper display 237 and expose a portion of the ground plane 265 to provide access to the ground plane 265 on top of base layer 262. During writing, electrical contact is made with the exposed portions of the ground plane 265 through the access windows 270. This allows biasing of the ion head while writing.

The protective layer 260 can be either transparent or opaque and has a thickness ranging from nanometers to millimeters. In one implementation, the protective layer 260 is formed from MYLAR film that has a thickness of approximately 100 microns. The charge-responsive layer 257 contains the microcapsules 205 and has a thickness which is commensurate with the diameter of the microcapsules 205. In one example, the charge-responsive layer 257 has a thickness of 100 microns. The charge receiving layer 225 in this example is a transparent semiconducting material with a thickness between 50-250 microns.

As discussed above, deposition of charges 281, 282 onto the charge receiving layer 225 influences the distribution of charged pigments in the microcapsules 205. Specifically, positive charges on the charge receiving layer 225 attract negatively charge pigments in the microcapsules 205. In this example, the white pigments have a negative charge and the black pigments have a positive charge. Where negative charges 282 have been deposited on the charge receiving layer 225, the black pigments are attracted to the surface. When viewed through the charge receiving layer 225, the negatively charged areas of the charge receiving layer 225 appear black and the positively charged areas appear white.

The charge receiving layer 225 in this example is formed from a semiconducting material which gradually dissipates the charges to the ground plane 265. The resistivity of the layer 225 is designed to enable fast movement of charges 281 and 282 through it as shown in FIG. 8B where charges 281 and 282 are moved to new locations 285 and 286, respectively. According to one example, the resistivity of the semiconducting charge receiving layer 225 is selected such that the discharge time constant is less than the few seconds after writing but before the media is ejected from the device and returned to the media holder. The charges will typically be transferred to the ground layer through the layer 257. In particular, the matrix material 230 is selected to provide the desired optical and mechanical characteristics, as well as the desired electrical resistivity.

In one aspect, the semiconducting charge receiving layer 225 is also designed to provide mechanical protection to the underlying layers while being hard enough to resist puncture from pointed objects.

In some examples, as will be understood from the previous examples of FIGS. 5-6, by making ground plane 265 transparent and by making at least a portion of protective layer 260 and base 262 to be transparent, or by removing a portion of protective layer 260 and base 262, the bottom surface 239 of e-paper display 237 is able to serve as a viewing side of the e-paper display 237. However, if ground plane 265 and base 262 are opaque, then imaging surface 238 of e-paper display 237 also becomes the viewing side, as represented via eye icon 211 in FIG. 8B.

FIGS. 9A-9E are a series of diagrams schematically illustrating a method of manufacturing a media, according to an example of the present disclosure, in which the media includes a recessed passive e-paper display. Each diagram includes a side sectional view and an accompanying top or bottom plan view.

In some examples, this method of manufacturing a media (including a recessed e-paper display) uses an all printed/lamination workflow. In some examples, this method is applicable to at least a financial transaction media (e.g. credit card, debit card, gift card, etc.) or an information transaction media, such as a security badge/card, shelf tag labels, etc. As shown in the diagram 350 of FIG. 9A, method 340 includes printing a cover element 361 onto a base 354, which has a first side 356 and a second side 358. In some examples, base 354 is made from a polymer material such as a polycarbonate material. In some examples, base 354 is transparent or at least translucent.

In one example, cover element 361 comprises a thin layer of colorant material and in some examples, further includes text 363, graphics 364, and/or images, as shown in the bottom plan view of FIG. 9A. It will be understood that side portions 360A, 360B of cover element 361 shown in the side view of FIG. 9A have an exaggerated thickness for illustrative purposes, and that in reality, cover element 361 has a much smaller thickness (T1) relative to the thickness (T2) of base 354.

In some examples, an outer edge 364 of cover element 361 is aligned with and/or overlaps with an outer edge 359 of base 354, such that cover element 361 covers the entire surface 358 of base 354 except for an area 359 visible through an aperture 365 in cover element 361. In examples in which the base 354 is a translucent or transparent material, the aperture 361 of cover element 361 provides a viewing window to see through base 354.

As shown in the side sectional view of diagram 380 of FIG. 9B, an e-paper display structure 382 is laminated onto the first side 356 of base 354. The bottom plan view of diagram 380 schematically illustrates a view of the e-paper display structure 382 as seen (represented via eye icon 111) through viewing window 365 and base 354. As shown in FIG. 9B, the e-paper display structure 382 bears an image 384 ("Card Balance $19.25"), which happened to be already present on the e-paper structure. It will be understood that e-paper display structure 382 is not limited to the particular image 370 shown in FIG. 9B, which is provided merely for illustrative purposes.

As shown in the side sectional view and top plan view of diagram 390 of FIG. 9C, a set of conductive traces 391 is applied to the base 354 adjacent the e-paper display structure 382. In the side view, the conductive traces are represented by conductive portions 392A, 392B while in the top plan view (as seen by viewing first side 356 of base 354), the conductive traces 391 are represented by portions 393, 394, and 395.

In some examples, the conductive traces 391 are printed while in some examples, the conductive traces 391 are laid down as a coating using a conductive material. In one example, the conductive traces 391 provide different ground return access paths as shown in the top plan view of diagram 390. As further shown in FIG. 9C, a reverse form of image 384 on e-paper display structure 382 is visible from the top plan view, and corresponds to a viewing position (represented via eye icon 111) looking directly at the imaging surface of e-paper structure 382.

As shown in the side sectional view and plan view of the diagram 420 of FIG. 9D, a generally opaque second structural support 424 is applied to cover the edges and ends 383 of the e-paper display structure 382 and to cover most of the conductive traces 391 (FIG. 9C) while leaving access at few locations to forming conductive contact pads 430 for ground path return connections from the imaging system. In one aspect, the second structural support 424 forms a cover, so that in combination with cover element 361, the e-paper display structure 382 has become embedded within a frame 430 of media. Moreover, as best seen in the side view of FIG. 9D, a top surface 385 of e-paper display structure is exposed within, and recessed (represented by R) relative to, an aperture 439 in top surface 438A of second structural support 424. Similar to the view shown in FIG. 9C, the plan view in FIG. 9D yields a reverse form of image 384 on e-paper display structure 382, and corresponds to a viewing position (represented via eye icon 111) looking directly at the imaging surface of e-paper structure 382.

As shown in the side sectional view and plan view of diagram 450 of FIG. 9E, a functional coating layer 460 is printed onto the top surface 385 (e.g. imaging surface) of the e-paper display structure 382. In one aspect, coating layer 460 acts to obscure visibility of the "reverse" form of image 384 on the e-paper display structure 382 (as seen in the top plan view), to protect the imaging side of the e-paper structure 382 from abrasion, and/or to improve dissipation of unwanted charges (as previously described in relation to at least FIGS. 8A-8B). In one aspect, an outer surface 461 of the functional coating layer 460 becomes the effective/accessible imaging surface of the e-paper display structure 382. In some examples, the functional coating layer 460 is consistent with, and/or includes at least some of substantially the same features and attributes as, protective, charge-receiving layer 225 as previously described in association with at least FIGS. 8A-8B.

Similar to the view shown in FIGS. 9C-9D, the plan view portion in FIG. 9E further illustrates opaque coating layer 460 that blocks a view of the imaging surface of the e-paper display structure 382, with the plan view corresponding to a viewing position (represented via eye icon 111) looking directly at the coating layer 460 overlying the e-paper structure 382.

Figure 10:
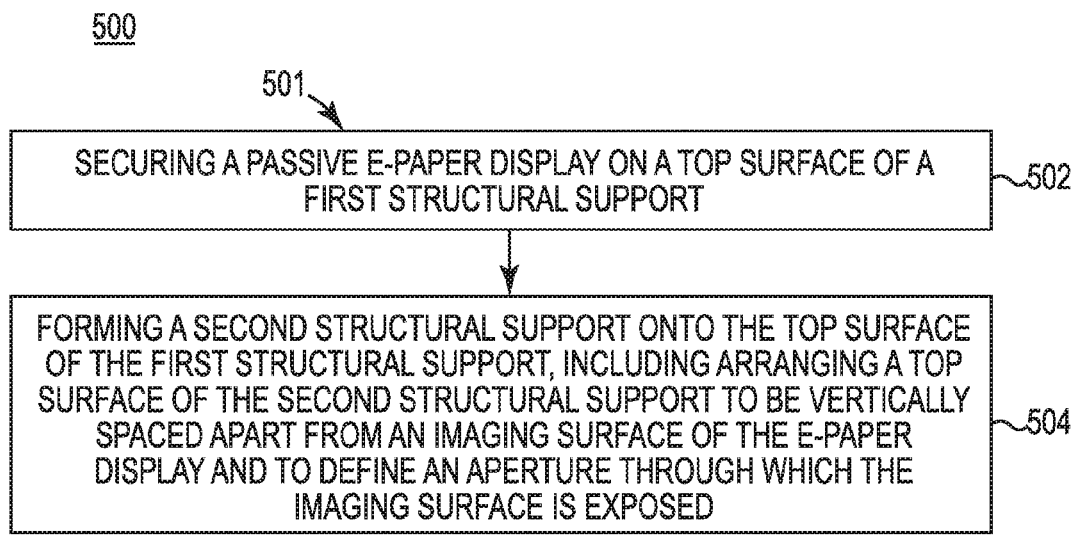
FIG. 10 is a flow diagram of a method of manufacturing a media including a recessed, passive e-paper display, according to an example of the present disclosure.

FIG. 10 is a flow diagram 500 of a method 500 of manufacturing a display media, according to an example of the present disclosure. In some examples, method 501 is performed by employing at least some of the components, modules, and systems previously described in association with FIGS. 1-9E. In some examples, method 501 is performed by employing at least some of the components, modules, and systems other than those previously described in association with FIGS. 1-9E.

As shown in FIG. 10, at 502 method 501 includes securing a re-writable, passive electronic paper on a first structural support, such as a top surface of the first structural support. In some examples, the first structural support has a length and a width greater than a length and a width of the electronic paper. At 504, method 501 includes forming a second structural support onto the top surface of the first structural support. This forming includes arranging a top surface of the second structural support to be vertically spaced apart from an imaging surface of the e-paper display and to define an aperture through which the imaging surface is exposed. In some examples, portions of the second structural support are positioned on the first structural support at opposite ends and at opposite side edges of the e-paper.

At least some examples of the present disclosure provide for reliable, consistent non-contact imaging of a passive e-paper display via a media frame having an aperture in which the an imaging surface of the e-paper display is exposed and recessed.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A display media comprising:
a frame including a top surface defining at least a first aperture; and
a re-writable, passive e-paper display embedded within at least a portion of the frame and including an imaging surface exposed within, and recessed relative to, the first aperture,
wherein the top surface of the frame is a generally planar flat surface and is sized and shaped to slidably receive at least one contact portion of a writing module to position a writing portion of the writing module at a spaced distance over the imaging surface of the e-paper display for external through-the-air imaging.

2. The display media of claim 1, wherein the frame includes:
a first structural support having a length and a width greater than a length and a width of the electronic paper display; and
a second structural support on opposite ends and on opposite side edges of the e-paper display, the second structural support having a thickness greater than a thickness of the e-paper display such that a top surface of the e-paper display is recessed relative to a top surface of the second structural support by a first distance, wherein the top surface of the second structural support corresponds to a top surface of the frame.

3. A display media comprising:
a frame including a top surface defining at least a first aperture; and
a re-writable, passive e-paper display embedded within at least a portion of the frame and including an imaging surface exposed within, and recessed relative to, the first aperture,
wherein the frame includes:
a first structural support having a length and a width greater than a length and a width of the e-paper display; and
a second structural support on opposite ends and on opposite side edges of the e-paper display, the second structural support having a thickness greater than a thickness of the e-paper display such that the imaging surface of the e-paper display is recessed relative to a top surface of the second structural support by a first distance, wherein the top surface of the second structural support corresponds to the top surface of the frame,
wherein the first structural support includes:
an at least translucent portion having a width and a length generally corresponding to the width and the length of the e-paper display with the at least translucent portion being on an opposite side of the e-paper display than the imaging surface, wherein information written on the e-paper display is viewable through the at least translucent portion.

4. A display media comprising:
a frame including a top surface defining at least a first aperture; and
a re-writable, passive e-paper display embedded within at least a portion of the frame and including an imaging surface exposed within, and recessed relative to, the first aperture
wherein the frame includes:
a first structural support having a length and a width greater than a length and a width of the e-paper display; and
a second structural support on opposite ends and on opposite side edges of the e-paper display, the second structural support having a thickness greater than a thickness of the e-paper display such that the imaging surface of the e-paper display is recessed relative to a top surface of the second structural support by a first distance, wherein the top surface of the second structural support corresponds to the top surface of the frame,
wherein the first structural support includes an at least translucent portion having a width and a length generally corresponding to the width and the length of the e-paper display with the at least translucent portion being on an opposite side of the e-paper display than the imaging surface, wherein information written on the e-paper display is viewable through the at least translucent portion,
wherein the first structural support includes a second aperture generally aligned with the e-paper display, wherein information written on the e-paper display is viewable through the at least translucent portion, and wherein the top surface of the e-paper display exposed within the first aperture is generally opaque.

5. The display media of claim 2, wherein the first structural support is generally opaque, wherein information written on the e-paper display is viewable through the aperture in the second structural support.

6. The display media of claim 1, comprising:
a ground electrode sheet sandwiched between a top surface of the first structural support and the e-paper display, and sandwiched between the top surface of the first structural support and a bottom portion of the second structural support.

7. A display media comprising:
a frame including a top surface defining at least a first aperture;
a re-writable, passive e-paper display embedded within at least a portion of the frame and including an imaging surface exposed within, and recessed relative to, the first aperture; and
a ground electrode sheet sandwiched between a top surface of first structural support of the frame and the e-paper display, and sandwiched between the top surface of the first structural support and a bottom portion of a second structural support of the frame, wherein a top surface of the second structural support corresponds to the top surface of the frame, wherein the second structural support includes at least a third aperture spaced laterally from the e-paper display, wherein the third aperture exposes a portion of the ground electrode sheet to provide a ground access path.

8. A method of manufacturing a display media, the method comprising:
    securing a passive e-paper display on a top surface of a first structural support;
    forming a second structural support onto the top surface of the first structural support, including arranging a top surface of the second structural support to be vertically spaced apart from an imaging surface of the e-paper display and to define an aperture through which the imaging surface is exposed;
    arranging the top surface of the second structural support as a generally planar flat surface to receive slidable engagement of a contact portion of writing module to position a writing portion of the writing module over the exposed imaging surface of the e-paper display to deposit airborne charges onto the exposed imaging surface of the e-paper display; and
    arranging the vertical space between the imaging surface and the top surface of the second structural support to maintain a substantially uniform and constant gap between the imaging surface and the writing portion of the writing module.

9. The method of claim 8, wherein the e-paper display includes a bottom conductive layer, comprising:
    prior to the forming, printing conductive portions onto the first structural support and laterally to the bottom conductive layer of the e-paper display to establish connectivity between the conductive portions and the bottom conductive layer; and
    forming the second structural support adjacent edges of the e-paper display and at least partially on top of the conductive portions while exposing at least one conductive surface accessible relative to the top surface of the second structural support.

10. The method of claim 8, comprising:
    providing the first structural support to include a transparent portion aligned with the e-paper display;
    providing a bottom conductive layer of the e-paper display as a transparent member; and
    providing a top layer of the e-paper display as an opaque element.

11. The method of claim 8, comprising:
    providing the first structural support as an opaque member; and
    providing the top layer of the e-paper display as a transparent member.

12. An imaging system comprising:
    a writing module including:
        a contact portion to be slidably engageable relative to a top surface portion of a frame of a media; and
        an imaging head separate from the contact portion and within a first recess relative to the contact portion and oriented to emit airborne charges at a spaced distance relative to an imaging surface of a passive e-paper display exposed within, and recessed relative to, a first aperture defined by the top surface portion of the frame of the media.

13. The imaging system of claim 12, wherein the re-writable, passive e-paper display is embedded within at least a portion of the frame.

14. The imaging system of claim 13, wherein the writing module comprises:
    a frame including:
        the contact portion, which defines at least a second aperture; and
        the first recess comprising a surface at which the imaging head is positioned to emit the airborne charges through the second aperture toward the imaging surface of the e-paper display upon slidable engagement of the contact portion of the writing module relative to the top surface portion of the frame of the media.

15. The imaging system of claim 14, wherein the imaging head comprises a writing unit to emit the airborne charges to write images on the imaging surface.

16. The imaging system of claim 15, wherein the imaging head comprises:
    an erasing unit to erase images from the e-paper display prior to writing, the erasing unit separate from the writing unit.

* * * * *